United States Patent Office 2,978,435
Patented Apr. 4, 1961

2,978,435

HEAT HARDENABLE COMPOSITIONS COMPRISING EPOXIDE COMPOUNDS AND DICARBOXYLIC ANHYDRIDES

Otto Ernst, Pfeffingen, Basel-Land, Switzerland, assignor to Ciba Limited, Basel, Switzerland, a Swiss firm No Drawing. Filed May 15, 1958, Ser. No. 735,370

Claims priority, application Switzerland May 16, 1957

7 Claims. (Cl. 260—47)

It is known to use hexachloro-endomethylene-tetrahydrophthalic anhydride for hardening epoxy-resins. This hardener has the advantage of giving short gelatinization times, but is has the disadvantageous property of causing undesired high temperatures during hardening due to exothermic reaction. It is also known to use methyl-endomethylene-tetrahydrophthalic anhydride as a hardener for epoxy-resins. This hardener produces relatively low exothermic reaction temperatures, but the gelatinization times obtained therewith are for some purposes too long.

It would be expected that the use of a mixture of the two aforesaid anhydrides as a hardener for epoxy-resins would result in gelatinization times and exothermic reaction temperatures between the values observed when each of these anhydrides is used alone.

The present invention is based on the very unexpected observation that, when a mixture of hexachloro-endomethylene tetrahydrophthalic anhydride and methyl-endomethylene-tetrahydrophthalic anhydride is used for hardening epoxy-resins with the addition of an accelerator, exothermic reaction temperatures result which are the same as or lower than the reaction temperature that results when methyl-endomethylene-tetrahydrophthalic anhydride is used alone, notwithstanding that the other component of the mixture, namely hexachloro-endomethylene-tetrahydrophthalic anhydride, when used alone results in a considerably higher exothermic reaction temperature than when methyl-endomethylene-tetrahydrophthalic anhydride is used alone.

It is all the more surprising that the gelatinization times that result from using the mixture referred to above are shorter than those resulting from the use of methyl-endomethylene-tetrahydrophthalic anhydride alone. Low exothermic reaction temperatures, notwithstanding shorter gelatinization times, are very desirable, especially in the production of castings because then the cast articles are subject to smaller internal stresses and less shrinkage.

Accordingly, the present invention provides heat hardenable compositions, which comprise an epoxide compound containing $n$ epoxide groups calculated on the average molecular weight of the compound, where $n$ is a whole number or fractional number greater than 1, and a polycarboxylic anhydride mixture comprising hexachloro-endomethylene-tetraphthalic anhydride and methyl-endomethylene-tetrahydrophthalic anhydride.

The invention also provides a process for hardening epoxide compounds which contain $n$ epoxide groups calculated on the average molecular weight, where $n$ is a whole number or a fractional number greater than 1, wherein there is used as hardener a polycarboxylic anhydride mixture comprising hexachloro-endomethylene-tetrahydrophthalic anhydride and methyl-endomethylene-tetrahydrophthalic anhydride.

In this manner there are obtained self-extinguishing hardened synthetic resin compositions which in a few cases, as compared with epoxy-resin compositions that have been hardened with hexachloro-endomethylene-tetrahydrophthalic anhydride alone, possess a surprisingly high impact bending strength, for example, amounting to 15–20 centimeters per kilogram per square centimeter. There are advantageously used as hardeners mixtures which are liquid at room temperature and consist of 30–50% by weight of hexachloro-endomethylene-tetrahydrophthalic anhydride and 70–50% by weight of methyl-endomethylene-tetrahydrophthalic anhydride or 70–50% by weight of a mixture of at least 60% by weight of methyl-endomethylene-tetrahydrophthalic anhydride and at most 40% by weight of endomethylene-tetrahydrophthalic anhydride.

The anhydride mixture is advantageously used in a proportion such that 0.7–1.1 grams of equivalents, and advantageously 0.8 to 0.9 gram equivalents, of anhydride groups are present per gram equivalent of epoxide groups.

The epoxide compounds used in the invention have a 1:2-epoxy equivalency greater than 1.0. By the epoxy-equivalency reference is made to the average number of 1:2-epoxy groups.

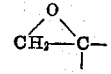

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds of the kind defined above, there may be mentioned, for example, epoxidized diolefines dienes or cyclic dienes, such as butadiene oxide 1:2:5:6-diepoxy-hexane and 1:2:4:5-diepoxy-cyclohexane; epoxidized diolefinic unsaturated carboxylic acid esters, such as methyl 9:10:12:13-diepoxy-stearate, the dimethyl ester of 6:7:10:11-diepoxy-hexadecane-1:16-dicarboxylic acid; and epoxidized compounds containing two cyclohexenyl radicals, such as diethylene glycol bis-(3:4-epoxy-cyclohexane carboxylate) and 3:4-epoxy-cyclohexylmethyl-3:4-epoxy-cyclohexane carboxylate. There may also be mentioned basic polyepoxide compounds, such as are obtained by the reaction of a secondary aromatic diamine, such as 4:4'-di-[monomethylamino]-diphenylmethane, with epichlorhydrin in the presence of an alkali.

There may also be used polyglycidyl esters such as are otbainable by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid, and especially aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol bis-(para-carboxyphenyl)-ether or the like. There may be mentioned, for example, diglycidyl adipate and diglycidyl phthalate, and also diglycidyl esters which correspond to the average formula

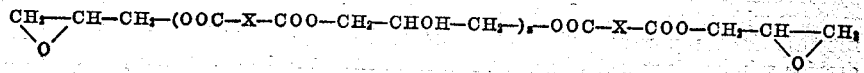

in which X represents an aromatic hydrocarbon radical, such as a phenyl group, and Z represents a small whole number or a small fractional number.

There may also be mentioned polyglycidyl ethers such as are obtainable by the etherification of dihydric or polyhydric alcohol or a diphenol or polyphenol with epichlorhydrin or dichlorhydrin in the presence of an alkali. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols, such as resorcinol, pyrocatechol, hydroquinone, 1:4-dioxynaphthalene, 1:5-dioxynaphthalene, phenol-formaldehyde condensation products, bis-[4-hydroxyphenyl]-methane, bis-[4-hydroxyphenyl]-methylphenyl-methane, bis-[4-hydroxyphenyl]-tolyl-methane, 4:4'-dioxydiphenyl, bis-[4-hydroxyphenyl]-sulfone and especially 2:2-bis-[4-hydroxyphenyl]-propane. There may be mentioned ethylene glycol diglycidyl ether and resorcinol diglycidyl ether, and also diglycidyl ethers which correspond to the average formula

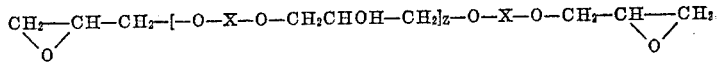

in which X represents an aromatic radical, and Z represents a small whole number or small fractional number.

There are especially suitable epoxy resins that are liquid at room temperature, for example, those obtained from 4:4'-dioxydiphenyl-dimethylmethane, which have an epoxide content of about 3.8 to 5.88 epoxide equivalents per kilogram. Such epoxy-resins correspond, for example, to the average formula

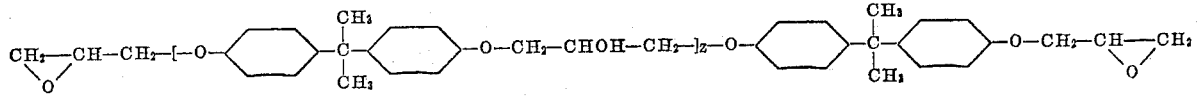

in which Z represents a small whole number or small fractional number, for example, between 0 and 2.

Alternatively, molten solid epoxy-resins or solutions of solid epoxy-resins may be used. The mixtures of epoxy-resin and anhydrides or their components may be mixed with a diluent, plasticiser, solvent, pigment, filling material and/or hardening accelerator. If desired, they may also contain a reactive diluent and/or plasticiser.

The compositions containing an epoxy-resin (polyepoxide compound) and a polycarboxylic anhydride mixture as defined above may be used, for example, as casting, coating, dipping or laminating compositions, as adhesives or impregnating agents, as resins for the manufacture of tools and patterns and as putty-like or modelling compositions.

The following examples illustrate the invention, the parts and percentages being by weight:

Example 1

For the manufacture of casting resin mixtures an epoxy resin, which is liquid at room temperature and has an epoxide content of at least 5.1 gram equivalents of epoxide groups per kilogram, which has been prepared by condensing 1 mol of 4:4'-dihydroxydiphenyl dimethylmethane with at least 2 molecular proportions of epichlorohydrin in the presence of an aqueous sodium hydroxide solution, is mixed with the under-mentioned anhydrides or mixtures of anhydrides of the polycarboxylic acids, with the use of 0.9 gram equivalent of anhydride groups for every gram equivalent of epoxide group present in the epoxy resin. To compare the gelatinization times and the maximum exothermic reaction temperatures 10 specimens of casting resin are made with the use of 100 grams of casting resin mixture for every specimen and these specimens are then placed in an oven heated at 120° C.

In the case of specimens 1, 3, 4 and 5—and 1a, 3a, 4a and 5a respectively—the epoxy resin, if desired together with the accelerator, and the anhydride or anhydride mixture are separately heated to 120° C., then combined and stirred; this point of time is designated as time 0 Mi. In the case of specimens 2 and 2a respectively the epoxy resin, if desired together with the accelerator, is heated to 150° C., the solid hexachloroendomethylene-tetrahydrophthalic anhydride is added and dissolved at 120° C.; this point of time is designated in this case as time 0 Min. As accelerator is further added to specimens 1a–5a 0.5 part of tris-(dimethylaminomethyl)-phenol.

The abbreviations used in the following table have the following meaning:

HET=hexachloroendomethylenetetrahydrophthalic anhydride,
MET=methylendomethylenetetrahydrophthalic anhydride,
ET=endomethylenetetrahydrophthalic anhydride,
Ph.A.=phthalic anhydride.

| Specimen | Composition of polycarboxylic acid anhydride | Accelerator | Gelatinization time in mins. at 120° C. | Maximum exothermic reaction temperature in ° C. |
|---|---|---|---|---|
| 1 | 60% MET+40% HET | 0 | 50 | 143 |
| 2 | 100% HET | 0 | 16 | 191 |
| 3 | 100% MET | 0 | no gelatinization after 12 hours | |
| 4 | 100% Ph.A. | 0 | 85 | 165 |
| 5 | 50% MET+40% HET+10% ET | 0 | 50 | 139 |
| 1a | 60% MET+40% HET | 0.5 | 6 | 161 |
| 2a | 100% HET | 0.5 | 2 | 210 |
| 3a | 100% MET | 0.5 | 14 | 161 |
| 4a | 100% Ph.A. | 0.5 | 4 | 210 |
| 5a | 50% MET+40% HET+10% ET | 0.5 | 6 | 161 |

As can be seen from this table the specimens 1 and 1a according to the invention surprisingly give the lowest exothermic reactions at practically identical gelatinization times.

Example 2

Degreased and ground sheets of aluminum (170×25×1.5 mm.), marketed under the trademark "Anticorodal B," are cemented together with the specimens 1a to 3a described in Example 1 (with an overlap of 10 mm.) and after hardening for 7 hours at 150° C. the tensile shear strengths of the laminations are measured.

| Specimen | Tested at °C. | Tensile shear strength in kg./sq. mm. |
|---|---|---|
| 1a | −40 | 2.0 |
| 2a | −40 | 1.3 |
| 3a | −40 | 1.8 |
| 1a | +23 | 2.25 |
| 2a | +23 | 1.4 |
| 3a | +23 | 1.65 |
| 1a | +125 | 1.55 |
| 2a | +125 | 1.05 |
| 3a | +125 | 0.85 |
| 1a | +150 | 0.85 |
| 2a | +150 | 0.9 |
| 3a | +150 | 0.4 |

As the above table shows, the specimen 1a according to the invention surprisingly has substantially better, or at least equal, tensile shear strength.

Example 3

A novolak prepared from 2 molecular proportions of orthocresol and 1 molecular proportion of formaldehyde in the presence of dilute hydrochloric acid is condensed with epichlorohydrin in the presence of sodium hydroxide. After having been washed with water until it is free from salt and distilled in a water-jet vacuum up to 150° C., the epoxy resin is liquid at room temperature and has an epoxide content of 4.9 gram equivalents of epoxide groups per kilogram. Casting resins are prepared by mixing this epoxy resin with the under-mentioned anhydrides or mixtures of anhydrides of polycarboxylic acids and amine accelerators, the addition amounting to 0.8 gram equivalent of anhydride groups for every gram equivalent of epoxide group. To determine the gelatinization times and the maximum exothermic reaction temperatures 8 specimens of 100 grams each of casting resin are prepared. In the case of specimens 1 and 6 the epoxy resin together with the amine accelerator is heated to 150° C., the solid hexachloroendomethylene tetrahydrophthalic anhydride is added and dissolved at 120° C. In the case of specimens 2, 3, 4, 5, 7 and 8 the epoxy resin with the amine accelerator, and the polycarboxylic acid anhydride or mixture of anhydrides of polycarboxylic acids are separately heated to 120° C., then combined and mixed.

Example 4

A novolak is made from 2 molecular proportions of

| Specimen | Composition of the polycarboxylic acid anhydride | Amine accelerator | Gelatinization time at an oven temperature of 120° C. in mins. | Maximum exothermic reaction temperature in ° C. |
|---|---|---|---|---|
| 1 | 100% HET | 0.5% of tris-(dimethylamino-methyl) phenol. | 2 | 191 |
| 2 | 60% MET+40% HET | | 3 | 158 |
| 3 | 100% MET | | 11 | 164 |
| 4 | 50% MET+50% HET | | 2 | 162 |
| 5 | 70% MET+30% HET | | 4 | 159 |
| 6 | 100% HET | 0.5% dimethylaminopropylamine. | 1 | >190 |
| 7 | 60% MET+40% HET | | 3 | 162 |
| 8 | 100% MET | | 9 | 176 | phenol and 1.1 molecular proportion of formaldehyde in the presence of dilute hydrochloric acid and from it an epoxy resin is prepared as described in Example 3, which is liquid at room temperature and has an epoxide content of 5.1 gram equivalents of epoxide groups per kilogram. By mixing this epoxy resin with the under-mentioned anhydrides or mixtures of anhydrides of polycarboxylic acids casting resins are prepared, 0.9 gram equivalent of anhydride groups being added for every gram equivalent of epoxide group. There are further added 0.5%, calculated from the weight of the casting resin mixture, of tris-(dimethylaminomethyl)-phenol as accelerator. To determine the gelatinization times and the maximum exothermic reaction temperatures 3 specimens of 100 grams each of casting resin are made, specimen 1 being mixed like specimens 1 and 6 in Example 3, and specimen 2 and 3 like specimens 2, 3, 4, 5, 7 and 8 in Example 3.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | <1 | >190 |
| 2 | 60% MET+40% HET | 2 | 155 |
| 3 | 100% MET | 4 | 180 |

Example 5

By alkaline condensation of resorcinol and epichlorohydrin a liquid epoxy resin is prepared which has an epoxide content of 8.2 gram equivalents of epoxide groups per kilogram. By mixing this epoxy resin with the under-mentioned anhydrides or mixtures of anhydrides of polycarboxylic acids and amine accelerators casting resins are prepared, 0.9 gram equivalent of anhydride groups being added for every gram equivalent of epoxide group. There are further added 0.5%, calculated from the weight of the casting resin mixture, of tris-(dimethylamino-methyl)-phenol as accelerator. To determine the gelatinization times and the maximum exothermic temperatures 3 specimens of 100 grams each of casting resin are made. In the case of specimen 1 the epoxy resin is heated with the amine accelerator to 150° C., the solid hexachloroendomethylenetetrahydrophthalic anhydride is added and dissolved at 120° C. In the case of specimens 2 and 3 the epoxy resin with the amine accelerator on the one hand the anhydride or mixture of anhydrides of polycarboxylic acids on the other hand, are separately heated to 120° C. and then only mixed together.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | <1 | >190 |
| 2 | 60% MET+40% HET | 2 | 163 |
| 3 | 100% MET | 4 | 191 |

Example 6

An epoxy resin is prepared by condensation of 1:4-butanediol and epichlorohydrin in the presence of stannic chloride and subsequent treatment of the condensate with alkali. The resulting epoxy resin has an epoxide content of 7.8 gram equivalents of epoxide groups per kg., and by mixing this epoxy resin with the under-mentioned anhydrides of polycarboxylic acids and amine accelerators casting resins are made. Furthermore, there are added 0.5%, calculated from the weight of the casting resin mixture, of tris-(dimethylamino-methyl)-phenol as accelerator. To determine the gelatinization times and the maximum exothermic reaction temperatures 7 specimens of 100 grams each of casting resin are made. Specimen 1 is mixed like specimen 1 in Example 5, and specimens 2 to 7 like specimens 2 and 3 in Example 5.

| Specimen | Composition of the polycarboxylic acid anhydride | Gram equivalents of anhydride group for every gram equivalent of epoxide group | Gelatinization time at 120° C. oven temperature, in ° C. | Maximum exothermic reaction temperature in ° C. |
|---|---|---|---|---|
| 1 | 100% HET | 1.0 | <1 | >200 |
| 2 | 60% MET+40% HET | 1.0 | 1 | 182 |
| 3 | 100% MET | 1.0 | 6 | 191 |
| 4 | 60% MET+40% HET | 0.7 | 1 | 194 |
| 5 | 100% MET | 0.7 | 5 | 202 |
| 6 | 60% MET+40% HET | 1.1 | 1 | 185 |
| 7 | 100% MET | 1.1 | 6 | 197 |

*Example 7*

By alkaline treatment of a condensation product from 1 molecular proportion of aniline and at least 2 molecular proportions of epichlorohydrin a liquid epoxy resin is prepared having an epoxide content of 6.7 gram equivalents of epoxide groups per kilogram. By mixing this epoxy resin with the under mentioned anhydrides or mixtures of anhydrides of polycarboxylic acids and amine accelerators casting resins are made, 1.0 gram equivalent of anhydride groups being added for every gram equivalent of epoxide group. There are further added 0.1% calculated from the weight of the casting resin mixture, of tris-(dimethylaminomethyl)-phenol as accelerator. To determine the gelatinization times and the maximum exothermic reaction temperatures 3 specimens of 100 grams each of casting resin are prepared. Specimen 1 is mixed like specimen 1 in Example 5, and specimens 2 and 3 like specimens 2 and 3 in Example 5.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | <1 | >210 |
| 2 | 60% MET+40% HET | 2 | 190 |
| 3 | 100% MET | 13 | 210 |

*Example 8*

By condensing 4:4'-dihydroxyphenyldimethylmethane with epichlorohydrin in the presence of aqueous sodium hydroxide solution an epoxy resin is prepared which is solid at room temperature and has an epoxide content of 2.5 gram equivalents of epoxide groups per kilogram. By mixing this epoxy resin with the under-mentioned anhydrides or mixtures of anhydrides of polycarboxylic acids and amine accelerators casting resins are made, 0.9 gram equivalent of anhydride groups being added for every gram equivalent of epoxide group. To determine the gelatinization times and the maximum exothermic reaction temperatures 3 specimens of 100 grams each of casting resin are prepared. In the case of specimen 1 the epoxy resin is fused and heated to 150° C., 0.25% of tris(dimethylaminomethyl)-phenol are stirred in, and the solid hexachloroendomethylenetetrahydrophthalic anhydride is then added and dissolved at 120° C. In the case of specimens 2 and 3 the epoxy resin and the polycarboxylic acid anhydride or mixture of anhydrides of polycarboxylic acids are separately heated to 120° C., 0.25% of tris-(dimethylaminomethyl)-phenol are stirred into the epoxy resin, and the whole is then mixed with the polycarboxylic acid anhydride or mixture of anhydrides of polycarboxylic acids. To determine the gelatinization times and the maximum exothermic reaction temperatures an amount of 100 grams is used in each case.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | 1 | 170 |
| 2 | 60% MET+40% HET | 3 | 137 |
| 3 | 100% MET | 14 | 143 |

*Example 9*

By condensing 1:5-dihydroxynaphthalene with epichlorohydrin in the presence of alkali in epoxy resin is prepared which is solid at room temperature and contains 3.80 equivalents of epoxide groups per kilogram. By mixing this epoxy resin with the under-mentioned anhydrides or mixtures of anhydrides of polycarboxylic acids and amine accelerators casting resins are prepared, 0.9 gram equivalent of anhydride groups being added for every gram equivalent of epoxide group. There are further added 0.25%, calculated from the weight of the casting resin mixture, of tris-(dimethylaminomethyl)-phenol as accelerator. To determine the gelatinization times and the maximum exothermic reaction temperatures 3 specimens of 100 grams each of casting resin are prepared. Specimen 1 is mixed like specimen 1 in Example 8, and specimens 2 and 3 like specimens 2 and 3 in Example 8.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | <1 | 197 |
| 2 | 60% MET+40% HET | 3 | 172 |
| 3 | 100% MET | 8 | 185 |

*Example 10*

Casting resins are prepared by mixing an epoxy resin, which has been obtained by alkaline condensation of terephthalic acid and epichlorohydrin ("Metallon 130," makers: Messrs. Henkel) and contains 3.3 gram equivalents of epoxide groups per kilogram, with the under-mentioned anhydrides or mixtures of anhydrides of polycarboxylic acids, 1.0 gram equivalent of anhydride groups for every gram equivalent of epoxide group being added. There are further added 0.25%, calculated from the weight of the casting resin mixture, of tris-(dimethylaminomethyl)-phenol as accelerator. To determine the gelatinization times and the maximum exothermic reaction temperatures 3 specimens of 100 grams each of casting resin are prepared. Specimen 1 is mixed like specimen 1 in Example 8, and specimens 2 and 3 like specimens 2 and 3 in Example 8.

| Specimen | Composition of the polycarboxylic acid anhydride | Gelatinization time at an oven temperature of 120° C. in mins. | Maximum exothermic reaction temperature in ° C. |
|---|---|---|---|
| 1 | 100% HET | 1 | 190 |
| 2 | 60% MET+40% HET | 1 | 171 |
| 3 | 100% MET | 3 | 176 |

What is claimed is:

1. A heat-hardenable composition which comprises a 1:2-epoxide compound having a 1:2-epoxy equivalency greater than 1.0 and as hardening agent therefor a mixture comprising 30–50% by weight of said mixture of hexachloroendomethylene-tetrahydrophthalic anhydride and 70–50% by weight of said mixture of methylendomethylene-tetrahydrophthalic anhydride, said mixture being employed in a proportion such that 0.7–1.1 gram of equivalents of anhydride groups are present per gram equivalent of epoxide groups.

2. A heat-hardenable composition which comprises a 1:2 epoxide compound having a 1:2-epoxy equivalency greater than 1.0 and as hardening agent therefor a mixture comprising 30–50% by weight of said mixture of hexachloroendomethylene-tetrahydrophthalic anhydride and 70–50% by weight of said mixture of methylendomethylene-tetrahydrophthalic anhydride, which mixture is liquid at room temperature, and is employed in a proportion such that 0.7–1.1 gram of equivalents of anhydride groups are present per gram equivalent of epoxide groups.

3. A heat-hardenable composition which comprises a 1:2-epoxide compound having a 1:2-epoxy equivalency greater than 1.0 and as hardening agent therefor a mixture consisting of 30–50% by weight of said mixture of hexachloroendomethylene-tetrahydrophthalic anhydride and 70–50% by weight of said mixture of methyl-endomethylene-tetrahydrophthalic anhydride, said mixture being employed in a proportion such that 0.7–1.1 gram of equivalents of anhydride groups are present per gram equivalent of epoxide groups.

4. A heat-hardenable composition which comprises a 1.2-epoxide compound having a 1:2-epoxy equivalency greater than 1.0 and as hardening agent therefor a mixture consisting of 30–50% by weight of said mixture of hexachloroendomethylene-tetrahydrophthalic anhydride and 70–50% by weight of said mixture of a mixture of at least 60% by weight of methylenedomethylene-tetrahydrophthalic anhydride and at most 40% by weight of endomethylene-tetrahydrophthalic anhydride, said total mixture of anhydrides being employed in a proportion such that 0.7–1.1 gram of equivalents of anhydride groups are present per gram equivalent of epoxide groups.

5. A heat-hardenable composition which comprises a polyglycidyl ether of a polyhydric phenol and as hardening agent therefor a mixture consisting of 30–50% by weight of said mixture of hexachloroendomethylene-tetrahydrophthalic anhydride and 70–50% by weight of said mixture of methyl-endomethylene-tetrahydrophthalic anhydride, said mixture being employed in a proportion such that 0.7–1.1 gram of equivalents of anhydride groups are present per gram equivalent of epoxide groups.

6. A heat-hardenable composition which comprises a polyglycidyl ether of 4:4′-dihydroxy-diphenyl-dimethyl-methane and as hardening agent therefor a mixture consisting of 30–50% by weight of said mixture of hexa-chloroendomethylene-tetrahydrophthalic anhydride and 70–50% by weight of methyl-endomethylene-tetrahydrophthalic anhydride, said mixture being employed in a proportion such that 0.7–1.1 gram of equivalents of anhydride groups are present per gram equivalent of epoxide groups.

7. A heat-hardenable composition as claimed in claim 6, wherein the polyglycidyl ether is liquid at room temperature and contains about 3.8 to 5.88 gram equivalents of epoxide groups per kilogram.

References Cited in the file of this patent
UNITED STATES PATENTS

| | | |
|---|---|---|
| 2,744,845 | Rudoff | May 8, 1956 |
| 2,768,153 | Shokal | Oct. 23, 1956 |
| 2,863,853 | Pschorr | Dec. 9, 1958 |
| 2,934,520 | Maywrnik | Apr. 26, 1960 |

OTHER REFERENCES

Weiss: Ind. Eng. Chem. vol. 49, pp. 1089–1090.

UNITED STATES PATENT OFFICE

CERTIFICATION OF CORRECTION

Patent No. 2,978,435 April 4, 1961

Otto Ernst

It is hereby certified that error appears in the above numbered patent requiring correction and that the said Letters Patent should read as corrected below.

Column 2, line 39, after "diolefines" insert a comma; column 5, lines 45 and 46, strike out Example 4

A novolak is made from 2 molecular proportions of and insert the same above "phenol and 1.1 molecular proportion of formaldehyde" in line 60, same column; column 8, line 14, for "in", second occurrence, read -- an --.

Signed and sealed this 29th day of August 1961.

(SEAL)
Attest:

ERNEST W. SWIDER
Attesting Officer

DAVID L. LADD
Commissioner of Patents